United States Patent [19]

Burton

[11] Patent Number: 4,464,888
[45] Date of Patent: Aug. 14, 1984

[54] COLLECTOR LEAF CONSTRUCTION FOR HARVESTING MACHINE

[75] Inventor: Charles G. Burton, Lewiston, N.Y.

[73] Assignee: Chisholm-Ryder Company, Inc., Niagara Falls, N.Y.

[21] Appl. No.: 375,738

[22] Filed: May 7, 1982

[51] Int. Cl.³ .............................................. A01D 46/00
[52] U.S. Cl. .............................................. 56/330
[58] Field of Search ................... 56/330, 329, 328 R

[56] References Cited

U.S. PATENT DOCUMENTS

| | | | |
|---|---|---|---|
| 3,184,908 | 5/1965 | Rust | 56/330 |
| 3,225,894 | 12/1965 | Weygandt | 56/330 |
| 3,255,578 | 6/1966 | Pertics | 56/330 |
| 3,449,895 | 6/1969 | Pertics | 56/330 |
| 3,538,694 | 11/1970 | Holloway | 56/330 |
| 3,690,054 | 9/1972 | DeCarlo | 56/330 |
| 3,866,401 | 2/1975 | Claxton | 56/330 |
| 4,130,982 | 12/1978 | Clary | 56/330 |
| 4,134,251 | 1/1979 | Burton | 56/330 |
| 4,150,526 | 4/1979 | Burton | 56/330 |

FOREIGN PATENT DOCUMENTS 671779 7/1979 U.S.S.R. .............................. 56/330

Primary Examiner—Jay N. Eskovitz
Attorney, Agent, or Firm—Joseph P. Gastel

[57] ABSTRACT

A collector leaf construction for a grape harvester or the like including a generally planar body portion having an inner end, a concave leading edge, a convex trailing edge, and a convex outer edge, a pivot mounting at the inner end, a reinforcing plate at the inner end, and fasteners for securing the reinforcing plate to the body portion at the inner end.

17 Claims, 7 Drawing Figures

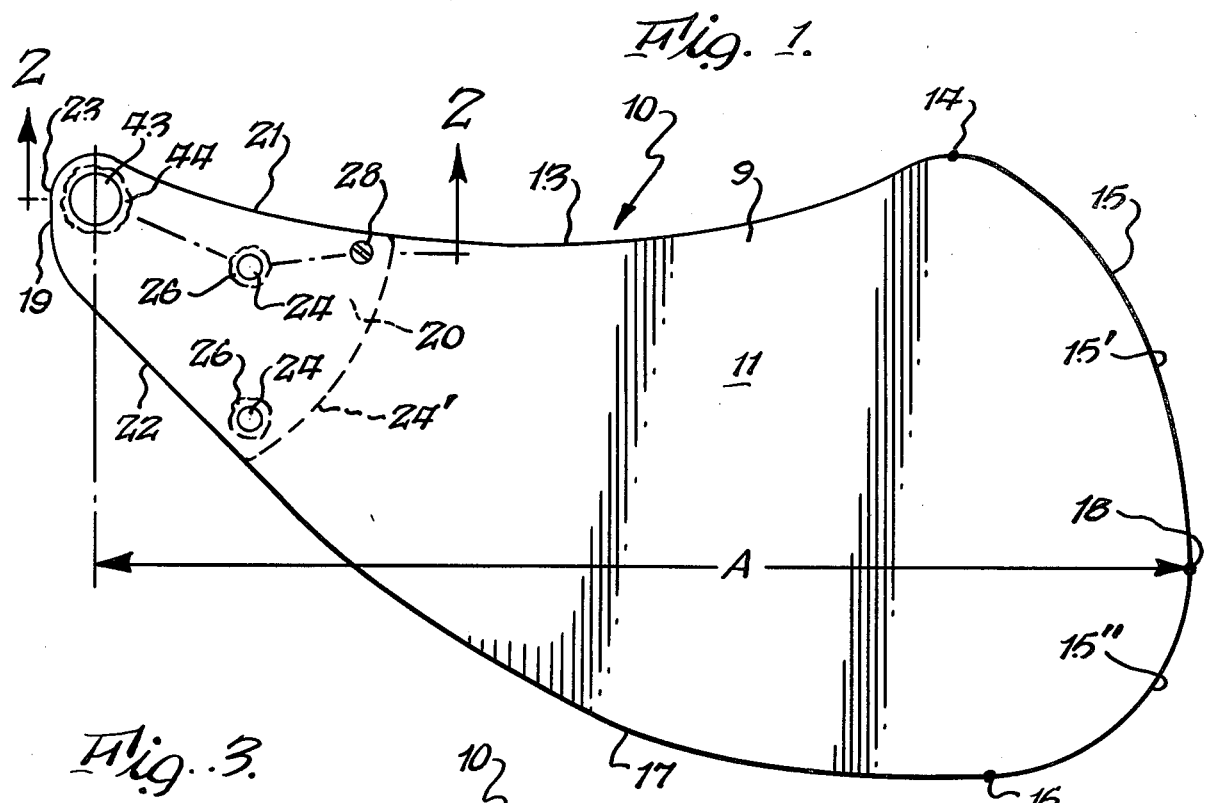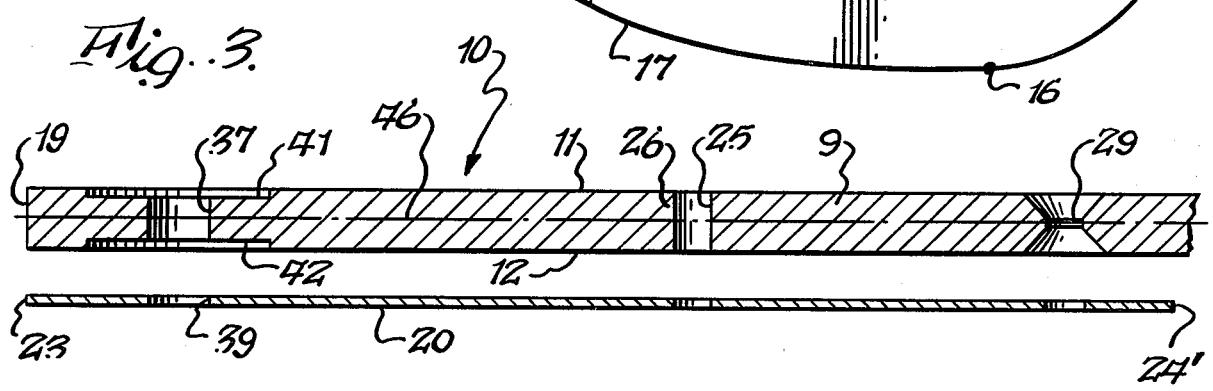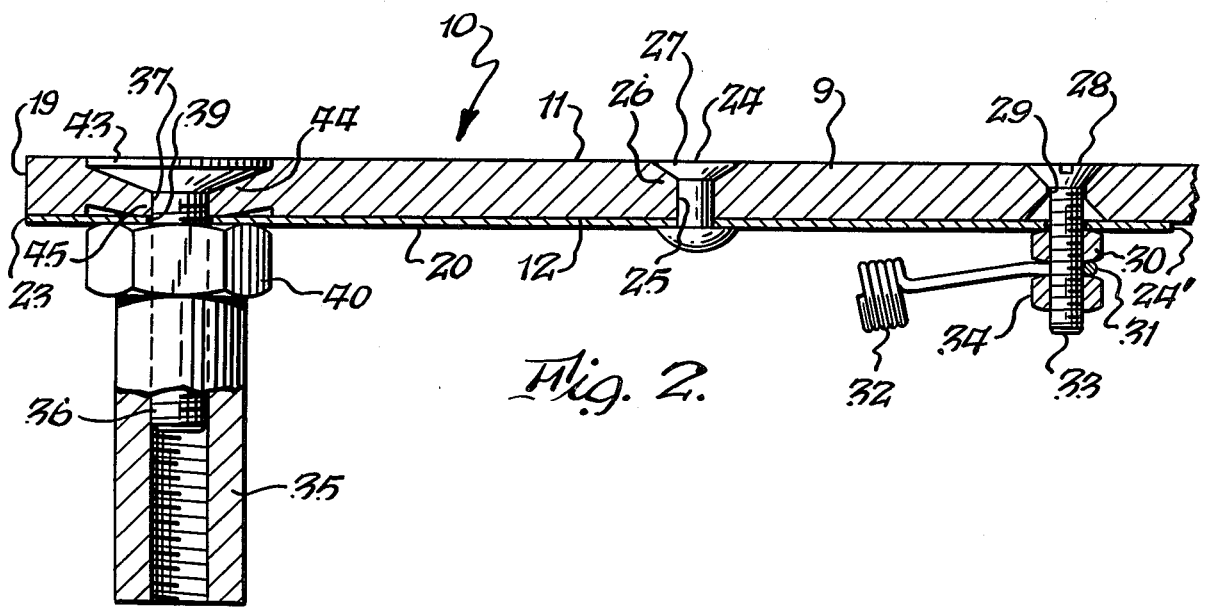

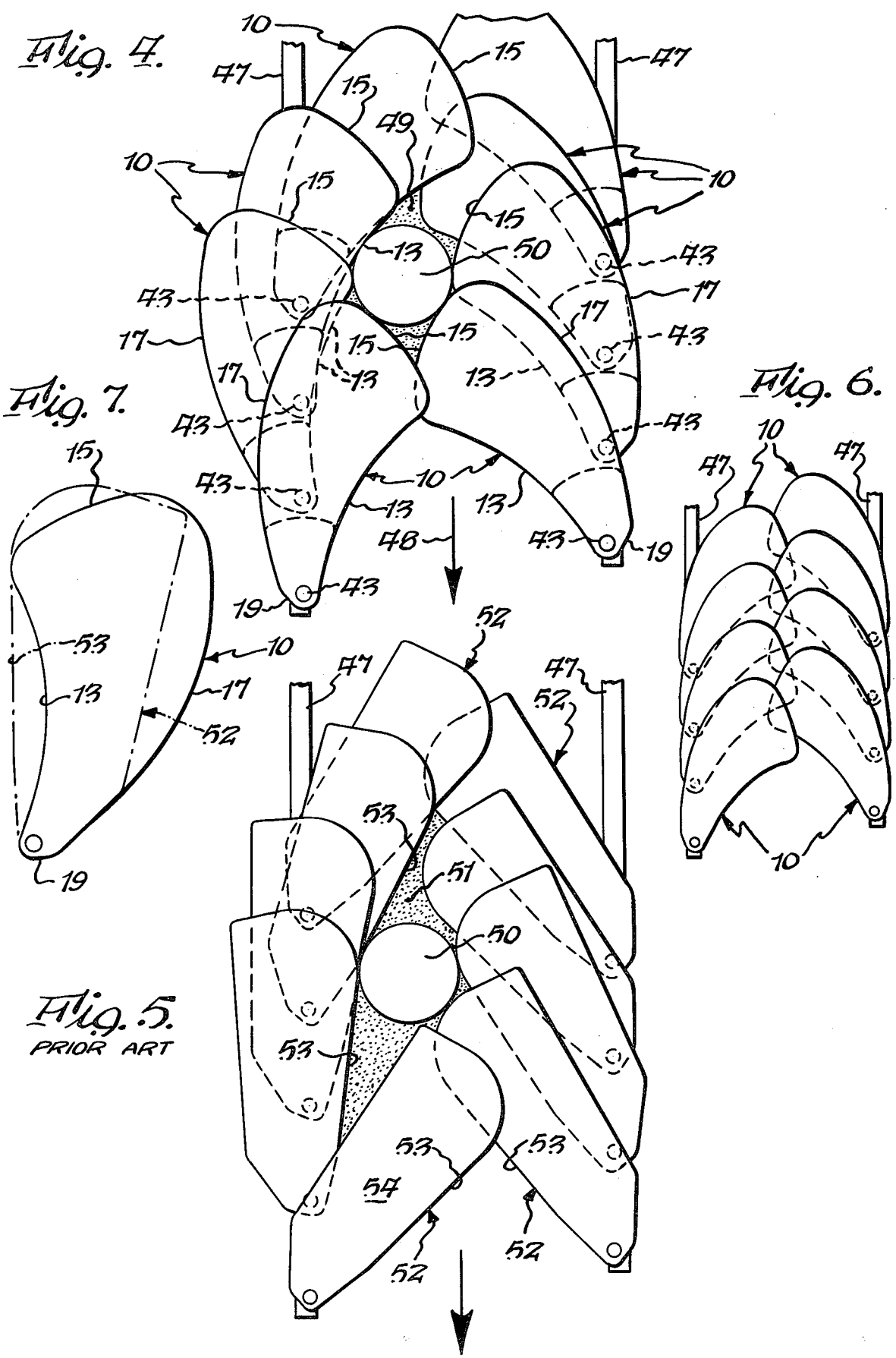

COLLECTOR LEAF CONSTRUCTION FOR HARVESTING MACHINE

BACKGROUND OF THE INVENTION

The present invention relates to an improved collector leaf for a harvesting machine of the type utilized to harvest grapes and other produce which is shaken from a vine or bush and which drops onto collector leaves mounted on the harvester.

By way of background, in the harvesting of grapes and other products, such as blueberries, a machine having an inverted U-shaped frame is driven along rows of plants, and harvesting mechanism on the machine shakes the fruit from the plants. The fruit falls on inclined collector leaves and slides onto conveyors which carry the harvested fruit off of the machine. A machine of this type is shown in U.S. Pat. No. 4,134,251.

The harvesting leaves on the prior art machine were of a predetermined peripheral contour such that when these leaves deflected to permit the machine to pass the trunks of the plants and the posts of the trellises, relatively large open spaces were formed in the immediate area surrounding the trunks and the posts, and harvested fruit fell through these open spaces onto the ground and was lost. Relative to grapes, calculations have shown that for a 600 acre harvesting area, the value of grapes lost per season amounted to well in excess of $100,000 at current market values. It is with an improved collector leaf construction which overcomes the foregoing shortcomings and which produces a very substantial saving of harvested fruit that the present invention is concerned.

SUMMARY OF THE INVENTION

It is accordingly one important object of the present invention to provide an improved harvesting machine collector leaf which is of a contour to effect the saving of a substantial amount of product which was heretofore lost in the harvesting.

Another object of the present invention is to provide an improved harvesting machine collector leaf assembly in which the leaves, when deflected by obstructions such as trellis posts and plant trunks, will produce a relatively small open space surrounding the obstruction so as to result in substantial savings of products which were heretofore lost.

A further object of the present invention is to provide an improved harvester leaf in which the body portion can be used for a right-hand or a left-hand mounting merely by turning it upside down.

Yet another object of the present invention is to provide an improved harvester leaf which is fabricated in such a manner that the various attachments thereto are self-locking, thereby obviating the necessity for lock washers and the like. Other objects and attendant advantages of the present invention will readily be perceived hereafter.

The present invention relates to a collector leaf construction for a harvesting machine comprising a generally planar body portion having an inner end, an outer edge, a leading edge and a trailing edge, said leading edge being concave, and pivot mounting means on said inner end for pivotally mounting a pivot member for pivotally mounting said harvester leaf on a harvesting machine.

The present invention also relates to a collector leaf assembly for a harvesting machine comprising a first row of first collector leaves of a first hand and a second row of second collector leaves of a second hand which is opposite to said first hand, said first and second collector leaves each having an inner end and a concave leading edge, a trailing edge and an outer edge, first and second spaced frame members, first mounting means for pivotally mounting said inner ends of said first collector leaves in spaced relationship on said first frame member, and second mounting means for pivotally mounting said inner ends of said second collector leaves on said second frame member, said first and second collector leaves being mounted in overlapping relationship with said concave leading edges of said first and second collector leaves facing in the same direction.

The various aspects of the present invention will be more fully understood when the following portions of the specification are read in conjunction with the accompanying drawings wherein:

BRIEF DESCRIPTION OF THE DRAWINGS

FIG. 1 is a plan view of the improved harvester leaf of the present invention;

FIG. 2 is an enlarged fragmentary cross sectional view taken substantially along line 2—2 of FIG. 1;

FIG. 3 is a view similar to FIG. 2 but showing the collector leaf and its reinforcing plate in exploded relationship;

FIG. 4 is a fragmentary plan view of an assembly of collector leaves of the present invention mounted on a harvesting machine and showing the positions which they assume in passing a trunk of a plant or a post of a trellis;

FIG. 5 is a view similar to FIG. 4 but showing the positions which prior art collector leaves assume when they are in the same relative position to a plant trunk or a trellis post as the leaves of FIG. 4;

FIG. 6 is a diminutive plan view similar to FIG. 4 but showing the positions occupied by the leaves when they are not moved out of their normal at rest positions by a plant trunk or trellis post; and FIG. 7 is a diminutive view showing an improved leaf of the present invention in solid lines superimposed over a prior art leaf in dotted lines.

DESCRIPTION OF THE PREFERRED EMBODIMENT

The improved collector leaf 10 of the present invention is intended to be mounted on a harvester of the type used for harvesting produce from grapevines, blueberry bushes, or the like, where the fruit is shaken from the plants and falls onto collector leaves mounted on the harvester. A machine of this type is shown and described in detail in U.S. Pat. No. 4,134,251, which is incorporated herein by reference. The improved collector leaves 10 of the present invention are intended to be mounted in the same manner as shown in the patent as a direct substitute for the collector leaves shown therein. The only difference in mounting is that the pivot points for the collector leaves of the present invention are not directly in line with each other, as shown in FIG. 15 of the patent, but are staggered with respect to each other as shown in FIG. 4 of the drawings.

The improved collector leaf 10 of the present invention includes a body portion 9 which is preferably fabricated from a plastic, such as polypropylene, and it includes an upper planar surface 11 and a lower planar surface 12. The leading edge 13 is of concave configuration and it extends to point 14 and at that point merges into convex side edge 15 which extends to point 16, at which point the convex side edge merges with convex trailing edge 17. Edge 13 is the leading edge and edge 17 is the trailing edge, when considering the direction of machine travel as shown by arrow 48 in FIG. 4. Also, edge 19 is considered the inner edge and edge 15 is considered the outer edge relative to the pivot 43. The trailing edge 17 merges into inner side edge 19 at the inner end of the leaf, and edge 19 merges into leading edge 13. Leading edge 13 is of a shorter radius than trailing edge 17.

A metal reinforcing plate 20 is provided for reinforcing the inner end of leaf 10. Plate 20 includes a leading edge 21, a trailing edge 22, an inner edge 23 and an outer edge 24'. Edges 21, 22 and 23 coincide substantially with portions of edges 13, 19 and 17, respectively. Plate 20 is secured to body 9 in the following manner. A pair of rivets 24 extend through bores, such as 25, to secure the central portion of reinforcing plate 20 to the body 9. The annular portions 26 (FIGS. 2 and 3) of body 9 are distorted by head 27 of rivet 24, and thus the resilience of the plastic in area 26 is utilized to provide a tight joint for the rivet. In addition, a screw 28 has its head located in countersunk hole 29 of body 9, and this screw is held in place by a nut 30. The end 31 of a spring 32 is mounted on shank 33 of bolt 28 and is retained thereon by nut 34. Spring 32 is analogous to spring 62 of the above cited U.S. Pat. No. 4,134,251, and it operates in the same manner. Insofar as pertinent here, it is to be noted that nut 30 functions to maintain plate 20 in engagement with undersurface 12.

A mounting sleeve 35, which is formed integrally with nut 40, is secured to the inner end of body 9 for pivotally mounting leaf 10 on the harvester in the manner described in detail above in the above-identified patent, and as shown in FIG. 9 thereof. Sleeve 35 and nut 40 are threaded in unison onto the end of bolt 36, which extends through bore 37 of body 9 and bore 39 of reinforcing plate 20. Counterbores 41 and 42 are provided at opposite ends of bore 37, and when the head 43 of bolt 36 is caused to assume the position of FIG. 2 by the tightening of sleeve 35 and nut 40, the annular portion 44 of body 9 will be caused to distort to the condition of FIG. 2 and the annular portion 45 adjacent bore 37 will also be caused to distort to the condition of FIG. 2. The resilience of distorted portions 44 and 45 will act as lock washers to prevent nut 40 from working loose.

As can be seen from FIG. 3, body 9 is symmetrical about centerline 46. Therefore, if reinforcing plate 20 is mounted on surface 12, the leaf 10 will be of one hand and if reinforcing plate 20 is mounted on surface 11, leaf 10 will be of the opposite hand. In other words, as can be seen from FIG. 4, the leaves on opposite sides of the machine are essentially mirror images of each other, and this mirror image relationship is achieved by either mounting reinforcing plate 20 on one side or the other of body 9.

Leaves 10 are pivotally mounted on rails 47 of the harvesting machine (FIG. 4). Leaves 10 are normally biased by springs 32 to the positions shown in FIG. 6. The direction of harvester travel is denoted by arrow 48. Partly because of the fact that the leading edges 13 of the harvester leaves are concave, the open space 49, which is denoted by a stippled area around plant trunk 50, will be relatively small as compared to the open area 51 (FIG. 5) around plant trunk 50 produced by prior art leaves 52 having straight leading edges 53. In other words, as can be seen from FIG. 4, the collector leaves 10 tend to hug the plant trunk 50 more closely than the prior art collector leaves 52 of FIG. 5, partly because of the concave leading portions. In addition, the specific contour of convex outer edges 15 tends to hold the leaves 10 in contact with plant trunk 50 for a longer period of time so that they do not move away from plant trunk 50 as soon as the prior art collector leaf 54 (FIG. 5) does to produce the relatively large open space. In addition, the convex trailing edges 17 will tend to cover a greater portion of the leading part of the following leaf. Thus, the concave leading edge 13 in combination with the convex trailing edge 17 and the convex outer edge 15 of leaf 10 all work together with like adjacent collector leaves to provide a relatively small open area surrounding the trunk 50 about which the collector leaves 10 move as the harvester travels in the direction of arrow 48.

In FIG. 4 the plant trunk 50 is to the left of center. The same results discussed above with respect to FIG. 4 will also be obtained when plant trunk 50 is in the direct center between rails 47 or to the right of center. It will be appreciated that as the harvester is moving along the rows of plants it cannot be maintained in the exact center between rails 47 but it will vary to different positions between the rails.

Tests made on models and in the field have shown that there is an average of approximately 50% less open space 49 surrounding a plant trunk 50 with the collector leaves of FIG. 4 as compared to the open space 51 produced by the prior art collector leaves of FIG. 5. It has been found that reducing the open space by an amount of approximately 50% has resulted in a saving of approximately 70% of the produce, such as grapes, heretofore lost. In other words, if the amount of grapes which were lost through open space 51 of FIG. 5 was considered to be a 100% loss, by the use of the collector leaves of FIG. 4, 70% of the amount previously lost was saved.

By way of dimensions, the distance A in FIG. 1 is approximately 19½ inches and the remainder of the dimensions of the leaf are drawn to scale. The distance A is the perpendicular distance from the center of the pivot mounting to point 18, which is located on outer edge 15 and is the maximum perpendicular distance from the pivot mounting. Point 18 is also located at the junction of the leading portion 15' and trailing portion 15" of outer edge 15. The leading portion 15' is longer than the trailing portion 15". Furthermore, the leading edge 13 has a shorter radius than the trailing edge 17. It can also be seen from FIG. 1 that the junction 18 of the trailing arcuate portion 15" of the outer edge 15 and the leading arcuate portion 15' of the outer edge is closer to the junction 16 than to the junction 14. Furthermore, the distance between the centerline of rails 47 is approximately 26 inches, and the pivots 43 are on eight-inch centers. In an actual harvester, there are 12 leaves on one side and 13 leaves on the opposite side. The body portion 9 is approximately ⅜ inches thick.

Calculations have shown that by the use of the improved collector leaves of the present invention there is a reduction in loss of grapes of about 1,000–1,200 pounds per acre, when the acre yields about 8 tons. This produces a saving of between about 12% to 15%. Based on a 30 day season in which a harvester harvests about 20 acres per day, and where there is a saving of about ½ ton per acre, there is a saving per machine of about 300 tons of grapes per season. Assuming a product value of grapes at about $400 per ton, the potential savings in a vineyard which yields 8 tons per acre would be about $120,000 per season for 600 acres.

It can thus be seen that the improved collector leaf of the present invention is manifestly capable of achieving the above enumerated objects, and while a preferred embodiment of the present invention has been disclosed, it will be appreciated that it is not limited thereto but may be otherwise embodied within the scope of the following claims.

What is claimed is:

1. A collector leaf construction for a harvesting machine comprising a generally planar body portion having an inner end, an integral leading edge, a trailing edge, an outer edge extending between said integral leading edge and said trailing edge, said integral leading edge being concave substantially throughout its entire length, and pivot mounting means on said inner end for mounting a pivot member for pivotally mounting said harvester leaf on a harvesting machine.

2. A collector leaf construction as set forth in claim 1 wherein said trailing edge is of convex shape.

3. A collector leaf construction as set forth in claim 2 wherein said trailing edge is longer than said integral leading edge.

4. A collector leaf construction as set forth in claim 2 wherein said outer edge is of convex shape.

5. A collector leaf construction as set forth in claim 2 including a metal reinforcing plate mounted at said inner end on the underside of said body portion.

6. A collector leaf construction as set forth in claim 4 wherein said outer edge includes a leading portion proximate said leading edge and a trailing portion proximate said trailing edge, and wherein said trailing portion of said outer edge is shorter than said leading portion of said outer edge.

7. A collector leaf construction as set forth in claim 4 wherein said integral leading edge is shorter than said trailing edge.

8. A collector leaf construction as set forth in claim 4 wherein said integral leading edge has a shorter radius than said trailing edge.

9. A collector leaf construction as set forth in claim 4 wherein the junction of the trailing portion of the outer edge and the leading portion of the outer edge is closer to the junction of said trailing edge and said trailing arcuate portion of said outer edge than to the junction of said leading arcuate portion of said outer edge and said integral leading arcuate edge, said junction of said trailing portion of said outer edge and said leading portion of said outer edge being located substantially at the maximum distance to a line through the center of said pivot member by a line perpendicular thereto from said outer edge.

10. A collector leaf construction as set forth in claim 1 wherein said leading edge includes an inner end portion proximate said pivot mounting means and an outer end portion proximate said outer edge, and wherein there is a junction between said outer edge and said trailing edge, and wherein said outer edge includes a portion extending away from said outer end portion of said leading edge which is increasingly distant from said pivot mounting means to a point intermediate said outer end portion and said junction of said outer edge with said trailing edge.

11. A collector leaf assembly for a harvesting machine comprising a first row of first collector leaves of a first hand and a second row of second collector leaves of a second hand which is opposite to said first hand, said first and second collector leaves each having an inner end, an integral leading edge which is concave substantially throughout its entire extent, a trailing edge, and a outer edge extending between said leading edge and said trailing edge, first and second spaced frame members, first mounting means for pivotally mounting said inner ends of said first collector leaves in spaced relationship on said first frame member, and second mounting means for pivotally mounting said inner ends of said second collector leaves on said second frame member, said first and second collector leaves being mounted in overlapping relationship with said integral concave leading edges of said first and second collector leaves facing in the same direction.

12. A collector leaf assembly as set forth in claim 11 wherein said trailing edges and outer edges are convex.

13. A collector leaf for a harvesting machine comprising a planar body portion, an inner end on said body portion, mounting means on said inner end for mounting said collector leaf on a harvesting machine, an integral leading edge on said body portion, said integral leading edge being concave substantially throughout its entire length, a trailing edge on said body portion, and an outer edge on said body portion extending between said concave leading edge and said trailing edge.

14. A collector leaf as set forth in claim 13 wherein said outer edge is convex.

15. A collector leaf as set forth in claim 14 wherein said trailing edge is convex.

16. A collector leaf for a harvesting machine comprising a planar body portion, an inner end on said body portion, mounting means on said inner end for mounting said collector leaf on a harvesting machine, an integral concave leading edge on said body portion, a trailing edge on said body portion, an outer edge on said body portion between said concave leading edge and said trailing edge, said outer edge being convex, said integral concave leading edge merging into said convex outer edge, said trailing edge being convex, and said convex outer edge merging into said trailing edge.

17. A collector leaf as set forth in claim 16 wherein said integral concave leading edge has a shorter radius than said convex trailing edge.

* * * * *